US008893975B2

(12) United States Patent
Sanford

(10) Patent No.: US 8,893,975 B2
(45) Date of Patent: Nov. 25, 2014

(54) DEVICE IDENTIFIER PROCESSING

(76) Inventor: Emery A. Sanford, San Francisco, CA (US)

( * ) Notice: Subject to any disclaimer, the term of this patent is extended or adjusted under 35 U.S.C. 154(b) by 129 days.

(21) Appl. No.: 13/607,663

(22) Filed: Sep. 7, 2012

(65) Prior Publication Data

US 2014/0069999 A1   Mar. 13, 2014

(51) Int. Cl.
*G06K 19/00*   (2006.01)

(52) U.S. Cl.
USPC .......................................... 235/487

(58) Field of Classification Search
USPC ................... 235/375, 462.01, 487
See application file for complete search history.

(56) References Cited

U.S. PATENT DOCUMENTS

| 6,647,402 | B1 | 11/2003 | Chiu |
| 7,450,012 | B2 | 11/2008 | Harmon |
| 7,617,982 | B1 | 11/2009 | Herwig et al. |
| 8,228,517 | B2 | 7/2012 | Yamada et al. |
| 2006/0126113 | A1 | 6/2006 | Narazaki |

*Primary Examiner* — Seung Lee
(74) *Attorney, Agent, or Firm* — Womble Carlyle Sandridge & Rice LLP

(57) ABSTRACT

A system for integrating a marked product housing includes an image capture device configured to capture an image of indicia formed on an exterior surface of the marked product housing, a controller in operative communication with the image capture device configured to process the image of the indicia to retrieve a unique product identifier represented by the indicia, and an indicia forming device in operative communication with the controller configured to form a coded formation onto an interior surface of the marked product housing representing the unique product identifier.

20 Claims, 9 Drawing Sheets

DEVICE IDENTIFIER PROCESSING

CROSS-REFERENCE TO RELATED APPLICATIONS

U.S. patent application Ser. No. 13/332,288, which was filed on Aug. 19, 2011 and is entitled "METAL SURFACE AND PROCESS FOR TREATING A METAL SURFACE," is hereby incorporated by reference for all purposes as if presented herein in its entirety.

FIELD OF THE DESCRIBED EMBODIMENTS

The described embodiments relate generally to product markings, and more particularly, to processing and marking of device identifiers during manufacturing and assembly of devices.

BACKGROUND

Conventionally, a unique serial number identifying a particular product may be marked or applied on an exterior surface of the particular product. For example, the unique serial number may be a device identifier number generated upon assembly of the particular product, and applied thereafter, at a final product assembly plant or place of manufacture. The applied serial number may be generated through interpretation of the particular product's options or manufacturing date, or may be retrieved from a database storing pre-generated numbers. Therefore, the applied serial number is controlled by the final place of manufacture and is more easily integrated into a device manufacturer's systems.

One appropriate serial number marking process may include a laser-marking process by which a laser etches or causes to etch an exterior surface of the newly serialized product. Other techniques may include application of labels, dyes, inks, or other forms of marking.

However, as product aesthetics become increasingly important to device manufacturers and consumers, processes of marking the products which are more cosmetically appealing may be too complicated and/or impossible to implement in a final assembly scenario. For example, any product markings requiring relatively high heat or exposure to chemicals may require application early in a manufacturing process, rather than after assembly as in the conventional art.

Therefore, what is needed are innovations in product marking and serialization that allow device manufacturers to apply cosmetically appealing product markings including device identifiers while still allowing for relatively easy integration into a manufacturer's serialization and/or control systems.

SUMMARY OF THE DESCRIBED EMBODIMENTS

This paper describes various embodiments that relate to product markings, and more particularly, to processing and marking of device identifiers during manufacturing and assembly of devices.

According to one embodiment of the invention, a system for integrating a marked product housing includes an image capture device configured to capture an image of indicia formed on an exterior surface of the marked product housing, a controller in operative communication with the image capture device configured to process the image of the indicia to retrieve a unique product identifier represented by the indicia, and an indicia forming device in operative communication with the controller configured to form a coded formation onto an interior surface of the marked product housing representing the unique product identifier.

According to another embodiment of the invention, a system for integrating a marked product housing includes an input device configured to interpret a coded formation on an interior surface of the marked product housing representing a unique product identifier, the unique product identifier being further represented by indicia formed on an exterior surface of the marked product housing, and a controller in operative communication with the input device configured to process the unique product identifier and associate the unique product identifier in a device identifier database.

According to another embodiment of the invention, a product housing includes an exterior surface and an interior surface. The exterior surface has indicia formed thereon representing a unique product identifier. The indicia is formed with an anodization process. The interior surface has a coded formation formed thereon representing the unique product identifier as well. The coded formation is formed through a process separate from the anodization process.

According to another embodiment of the invention, a method of marking a product housing includes applying a first indicia representing a unique product identifier on an exterior surface of the product housing, capturing and interpreting the indicia to retrieve the unique product identifier, storing the retrieved unique product identifier, and applying a coded formation to an interior surface of the product housing representing the retrieved unique product identifier.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

Various aspects of this disclosure may be better understood upon reading the following detailed description and upon reference to the drawings in which.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
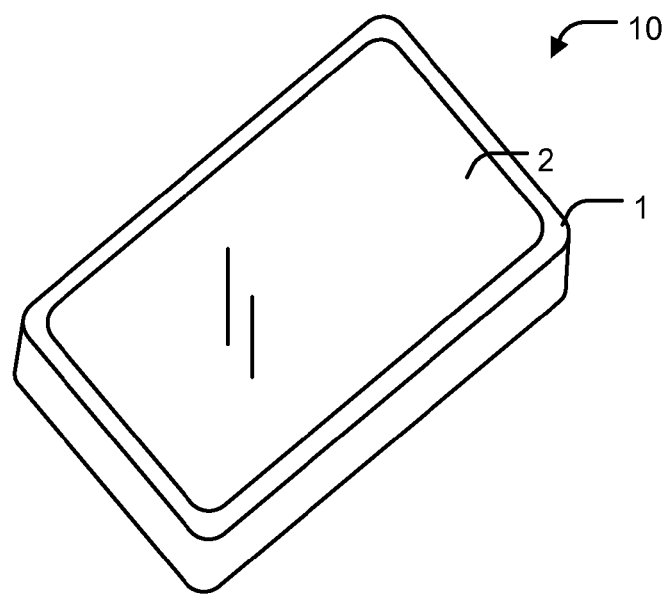
FIG. 1 is a perspective view of a first face of a product, according to an embodiment of the invention.

Turning to FIG. 1, a perspective view of a first face of a product 10 is illustrated, according to an embodiment of the invention. As illustrated, the product 10 may be a personal electronic device having a housing 1 and an interface 2. The housing 1 may be predominantly metal, and may be formed of aluminum, stainless steel, titanium, or any other desirable material. According to one embodiment of the invention, the housing 1 is formed of a milled block of aluminum. According to another embodiment of the invention, the housing 1 includes one or more panels formed from at least one of metal, glass, and ceramic.

The interface 2 may include a touch-sensitive screen, buttons, slides, switches, or any other interface components, and may populate one or more faces of the product 10. According to one embodiment of the invention, the interface 2 is an active matrix touch-sensitive display device configured to display content. According to another embodiment of the invention, the interface 2 includes at least one button and at least one display portion. According to another embodiment of the invention, the interface 2 includes at least one button and lacks a display portion. According to another embodiment of the invention, the interface 2 comprises a glass panel overlaying a display device and/or other interface components. According to yet another embodiment of the invention, the interface 2 includes an audio interface including at least one speaker configured to generate sound from content stored on a computer readable storage medium of the product 10 and/or generate sound relayed during a telephone call or retrieved remotely (e.g., from a server connected to the internet).

Figure 2:
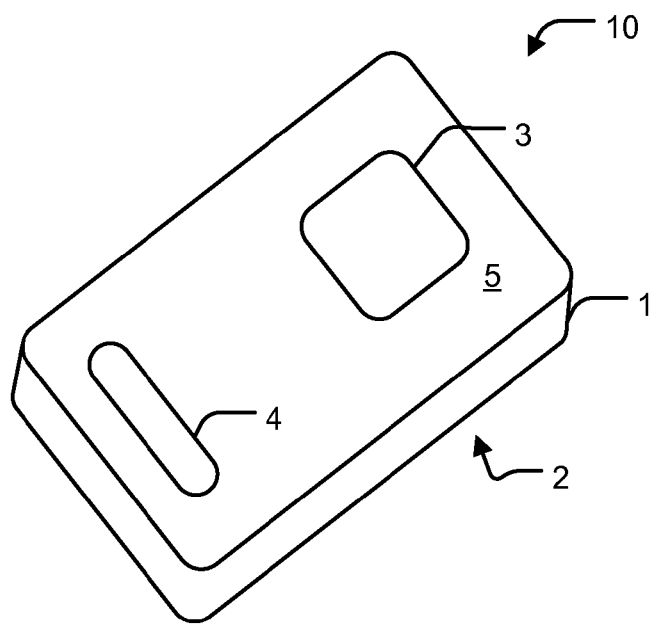
FIG. 2 is a perspective view of a second face of the product of FIG. 1.

FIG. 2 is a perspective view of a second face of the product 10, the second face being oriented in a direction opposite the first face. As illustrated, the second face of the product 10 includes an exterior surface 5. The exterior surface 5 may include at least one product marking 4 formed thereon. The at least one product marking area 4 may include indicia representative of a product identification number such as a serial number formed therein. The exterior surface 5 may further include other product markings 3 such as, for example, corporate logos or other graphics.

Figure 3:
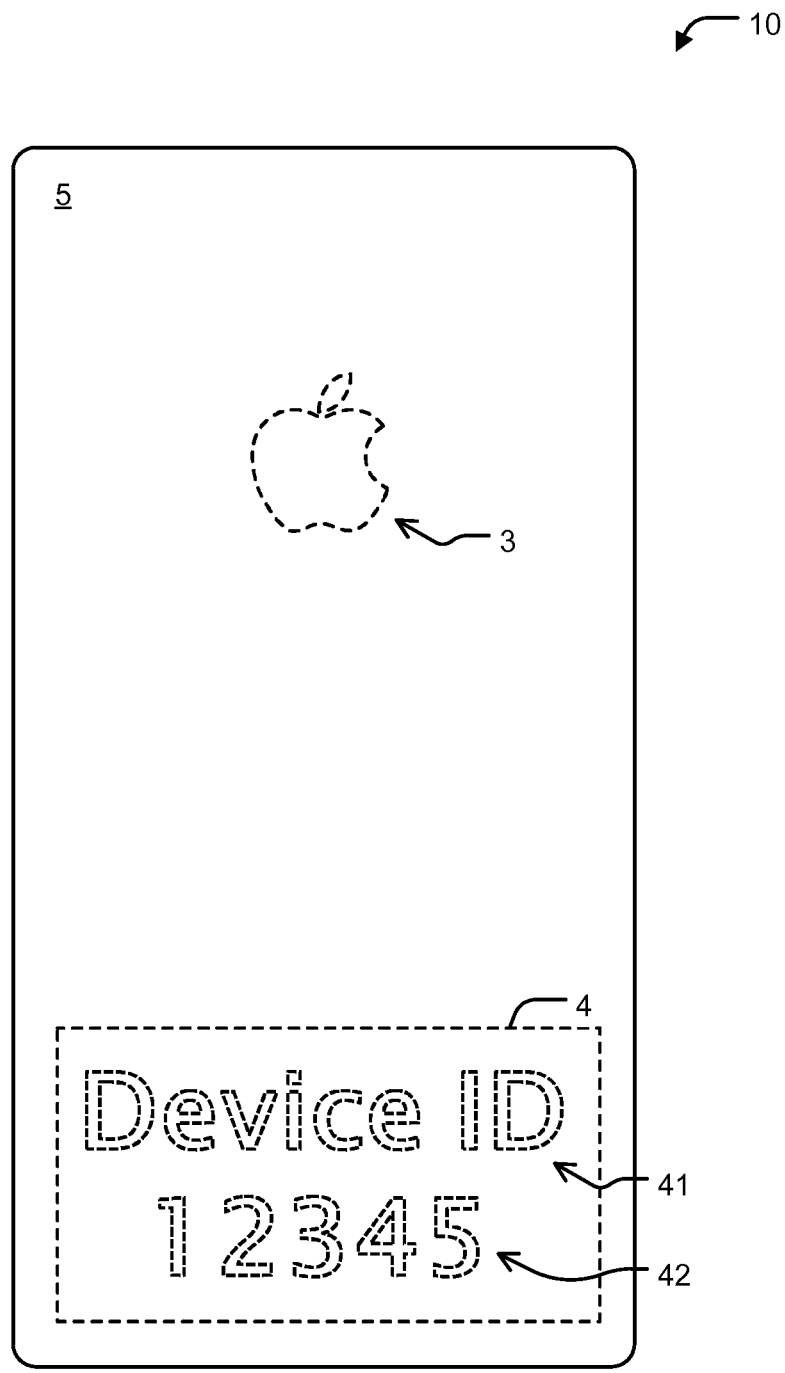
FIG. 3 is a detailed view of the second face depicted in FIG. 2.

FIG. 3 is a detailed view of the second face depicted in FIG. 2. As shown, the product marking 4 is disposed on the external surface 5 and may include indicia 41 representative of a type of indicia 42. In this example, indicia 41 depicts "DEVICE ID" such that a user of the product 10 easily identifies the indicia 42 as representing a device identifier or serial number of the product 10. The indicia 41 and 42 may be formed at least partially through an anodization process or other process to form indicia, and may be cosmetically appealing product markings.

For example, indicia 41 and 42 may be formed through a similar process as disclosed in presently co-pending U.S. patent application Ser. No. 13/332,288, filed on Aug. 19, 2011 and entitled "METAL SURFACE AND PROCESS FOR TREATING A METAL SURFACE." As such, indicia 41 and 42 may have contrasting surface textures or other appealing features.

Indicia 41 may be omitted in some embodiments, such that only indicia 42 is formed on surface 5. Furthermore, indicia 41 and/or 42 may be formed in different processes than those particularly disclosed herein. Moreover, differing or additional processes may be used to form individual portions of indicia 41 and/or 42 to increase or alter cosmetic appearance. Therefore, embodiments should not be limited to only those processes for forming product markings disclosed herein, but rather should include all product marking processes which form a relatively permanent and/or fixed marking discernable by a user of a product.

The indicia 41 and 42 may be formed during surface treatment and/or manufacture of a portion of the housing 1 within area 4. The particular illustrated placement of the area 4 may be altered according to any desired implementation of embodiments, and should not be limiting.

The indicia 41 and 42 may be based on a predetermined product serial number format. For example, the indicia 42 may represent a serial number having a fixed number of digits and/or characters, may represent a particular or fixed pattern of numbers and/or characters which may be integrated with a device manufacturer's serialization systems/software, and may represent a prior generated number supplied by a device manufacturer. Therefore, upon receipt of a manufactured housing by a final device manufacturer, the indicia 42 may be relatively easily discerned and integrated into the final device manufacturer's systems. This may be further facilitated through additional, non-cosmetic or obscured markings as depicted in FIG. 4.

Figure 4:
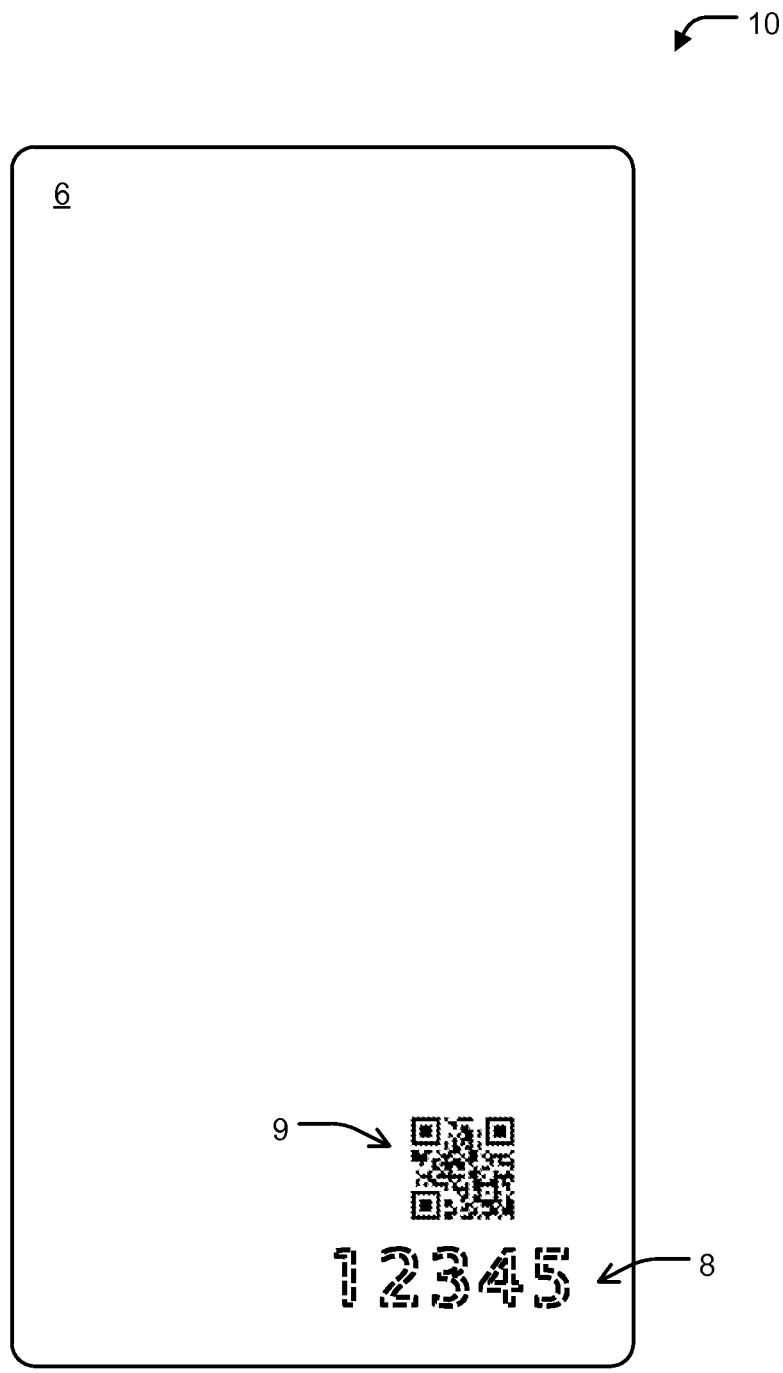
FIG. 4 is a view of an interior of a housing of the product of FIG. 1.

FIG. 4 is a view of an interior of housing 1 of the product 10. As illustrated, an interior surface 6 of the product 10 may be marked with a coded marking 9 and indicia 8 which mimic indicia 42 in content. The coded marking 9 may include one or more barcodes representative of an actual number depicted in indicia 8 and 42. According to one embodiment, the coded marking 9 is a one-dimensional or two-dimensional barcode. According to one embodiment, the coded marking 9 is a matrix barcode. The coded marking 9 may include any other coded formation discernable by an input device such as a laser scanner, image capture device (e.g., image sensor), or other device configured to scan and interpret the coded marking 9.

The coded marking 9 and indicia 8 may be formed by any suitable process, including laser etching, printing, or through application of ink and/or labels.

Hereinafter, systems implementing the markings described above are described in detail with reference to FIGS. 5A and 5B.

Figure 5A:
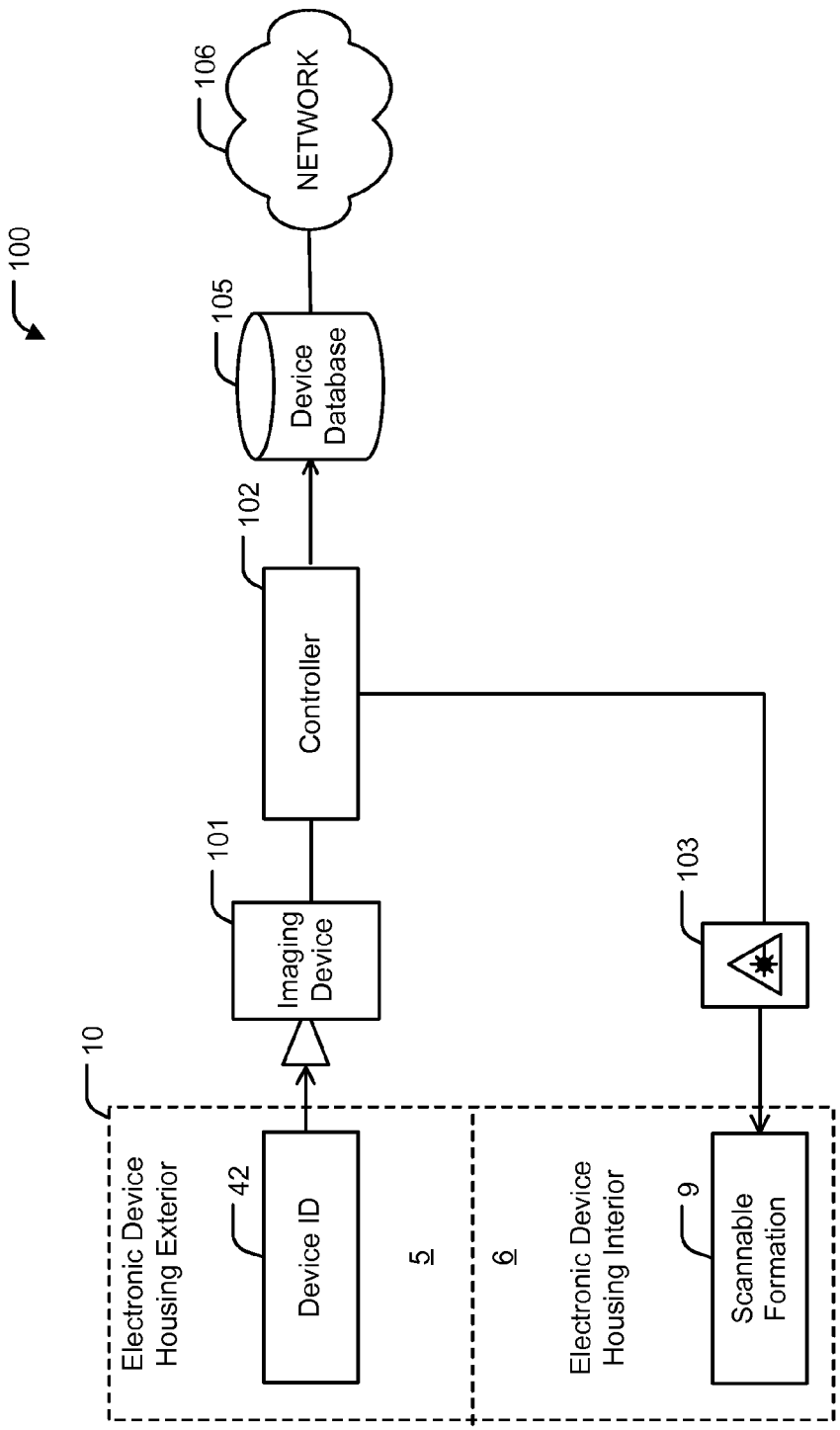
FIG. 5A is a schematic of a system for integrating a marked product housing, according to an embodiment of the invention.

FIG. 5A is a schematic of a system 100 for integrating a marked product housing, according to an embodiment of the invention. As illustrated, the system 100 includes an imaging device 101 in operative communication with a controller 102. The imaging device 101 may be any suitable imaging device, including a camera or image sensor, and may communicate image information to the controller 102 through an appropriate communication channel.

The controller 102 may be any suitable controller configured to process image information received from imaging device 101 to interpret a device identifier represented by indicia 42 from an exterior surface 5 of the product 10. For example, the controller 102 may be a general purpose computer processor configured to execute portions or all of the methods described herein.

The system 100 further includes an indicia forming device 103 in operative communication with the controller 102. The indicia forming device 103 may include any appropriate device, including devices configured to relatively permanently apply a coded formation such as formation 9 onto an interior surface 6 of a product 10. According to one embodiment, the indicia forming device 103 is a laser-etching device configured to laser-etch one or both of the coded formation 9 and indicia 8 onto the interior surface 6 of the product 10. According to another embodiment, the indicia forming device 103 is a labeling device configured to apply a permanent or semi-permanent label onto interior surface 6, the label including at least the coded formation 9. According to yet another embodiment, the indicia forming device 103 is a printing device configured to relatively permanently apply the coded formation 9 and/or indicia 8 onto the interior surface 6. The printing device may use mechanical printing (e.g., scoring, scraping, milling, or other surface alteration), permanent or semi-permanent ink printing (e.g., through an ink-printing head), or any other form of printing.

According to some embodiments of the invention, the system 100 retrieves at least one image of the indicia 42 representing a device identifier through the imaging device 101, interprets the same to extract the device identifier at the controller 102 and/or imaging device 101, directs the indicia forming device 103 to form at least the coded formation 9 on an interior surface of the product 10, and stores information related to the retrieved and coded device identifier in a device database 105 in communication with the controller 102. The device database 105 may be accessible over a network 106 such that product identification and activation may be relatively easily facilitated.

Furthermore, as described above, the coded formation 9 mimics or is a coded representation of the indicia 42. Therefore, the cosmetically appealing product marking from area 4 of exterior surface 5 may be integrated with existing device manufacturer's systems through the use of the formation 9. For example, although the product marking and indicia 42 may be cosmetically appealing and relatively difficult to process, through application of coded formation 9, device identifier information may be easily retrieved during product assembly such that it may be assigned as a unique product identifier without further marking to an exterior of the product 10. For example, FIG. 5B depicts a system 110 for integrating a marked product housing 10.

Figure 5B:
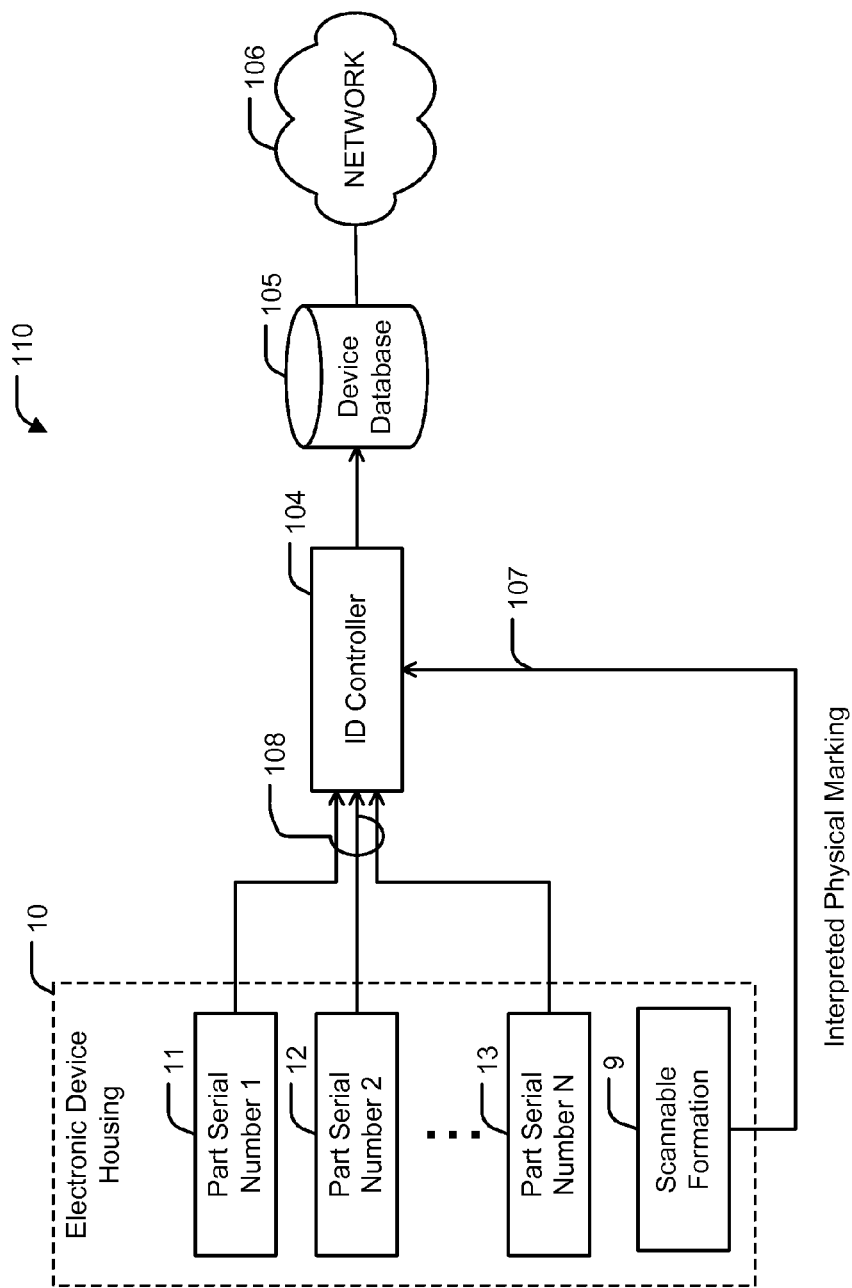
FIG. 5B is a schematic of a system for integrating a marked product housing, according to an embodiment of the invention.

As illustrated in FIG. 5B, the product 10 may include a plurality of internal components 11, 12, and 13 during assembly. Furthermore, each of the internal components 11, 12, and 13 may be represented by a different part serial number, model, or other designation. Furthermore, coded formation 9 may be accessible at an interior surface of the product 10. Therefore, the indicia 42 (which is easily identifiable by a user of the product 10) may be relatively easily associated within the device database 105 and therefore relatively easily integrated in a product manufacturer's serialization system for device activation and software coordination as described below.

For example, the system 110 includes a device identifier controller 104 configured to receive a device identifier interpreted from the coded formation 9 over channel 107. Channel 107 may represent a laser scanner, barcode reading device, image capture device, or other input device configured to relay the device identifier to the controller 104. The controller 104 may further receive component information regarding components 11, 12 and 13 over channel 108. Channels 108 may include data entry devices such as keyboards for entering of product information by a technician or technicians assembling the product 10. Channels 108 may further include other devices including laser scanners, barcode reading devices, image capture devices, or other input devices similar to channel 107, or may be integrated with channel 107 as a single input device or partial combination thereof. The controller 104 may be configured to assemble and associate the received component information with the received device identifier such that the same may be stored in the database 105.

The device identifier controller 104 may be somewhat similar to controller 102, or may be substantially different, for example, by being configured to perform different operations or steps associated with device assembly and product identifier integration.

As described above, embodiments of the invention provide product housings with cosmetically appealing markings representative of a device identifier. The device identifier may be interpreted and mimicked in a coded formation on an interior surface of the product housing for integration into a product manufacturer's device identifier database for further processing, device activation, integration with software, accessibility over a network, and/or other functions. Therefore, unique and cosmetically appealing product markings which are easily identifiable by users of products may be associated with device functionality through a device ID database and integrated into product manufacturer's systems.

Hereinafter, methods of marking a product and assembling a final product are described in detail with reference to FIGS. 6-9.

Figure 6:
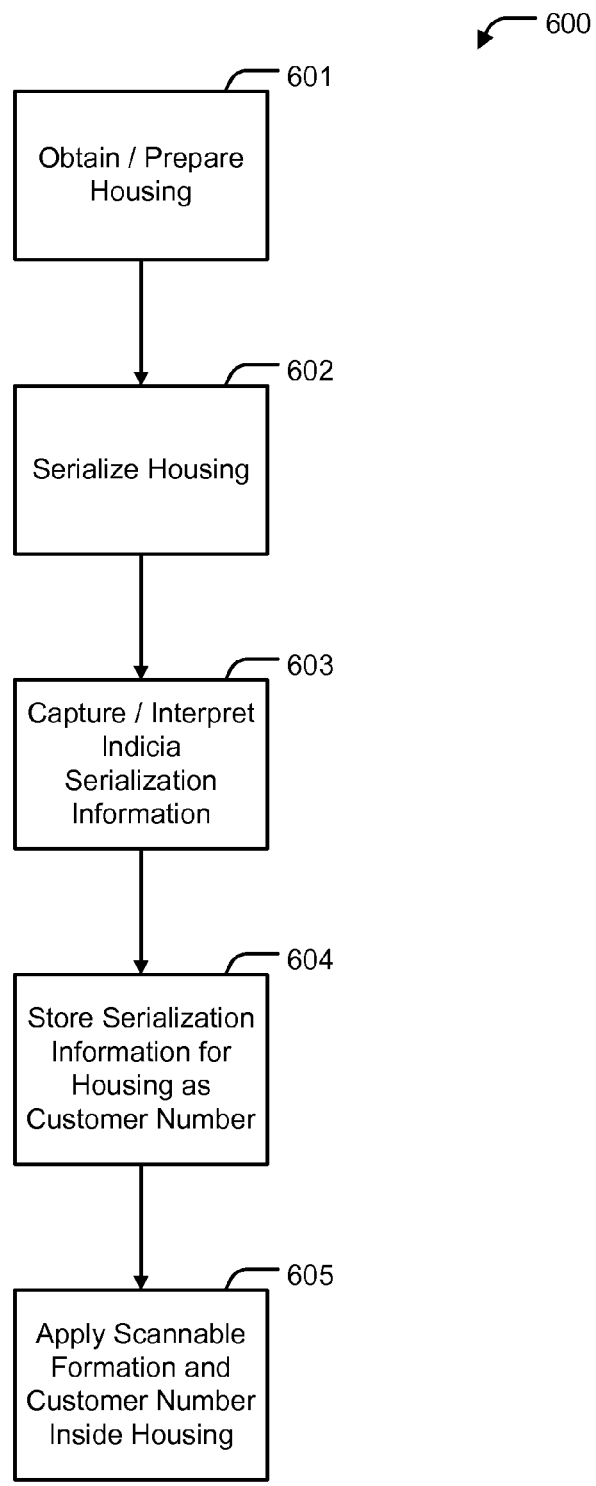
FIG. 6 is a flowchart of a method of marking a product, according to an embodiment of the invention.

FIG. 6 is a flowchart of a method 600 of marking a product, according to an embodiment of the invention. The method 600 includes obtaining/preparing a housing at block 601. Obtaining/preparing a housing may include forming at least a portion of a housing. The housing may be formed from a single piece of material, such as a metal (e.g., aluminum, stainless steel, titanium, glass, ceramic, etc) or from multiple pieces of material. The formed housing may be serialized at block 602. Serializing the housing may include applying at least a first indicia representing a product identifier on an exterior surface of the housing. The first indicia may be somewhat similar to indicia 42. Other indicia may be formed, including indicia 41 and/or graphic 3.

Upon serialization, the method 600 includes capturing and interpreting the indicia at block 603 to extract the serialization information. For example, an image may be taken of a portion of the surface of the product housing and processed to extract the represented product identifier. This may be facilitated through a system arranged somewhat similar to system 100.

The method 600 further includes storing the interpreted serialization information for the housing as a device identifier (e.g., customer accessible number or customer number) at block 604. The storing may be facilitated through a device identifier database such as database 105 with access to/from network 106. The storing may facilitate integration with a device manufacturer's systems such as software or device activation, product registration, and/or other functions related to a final assembled product.

The method 600 further includes applying a coded formation (e.g., a scannable barcode or other formation) onto an interior surface of the housing at block 605. The applying may include laser-etching or any other process described above. The applying may further include applying indicia mimicking the exterior indicia for easy identification by technicians assembling a product. These indicia and coded formations may be similar to formation 9 and indicia 8 described above.

Figure 7:
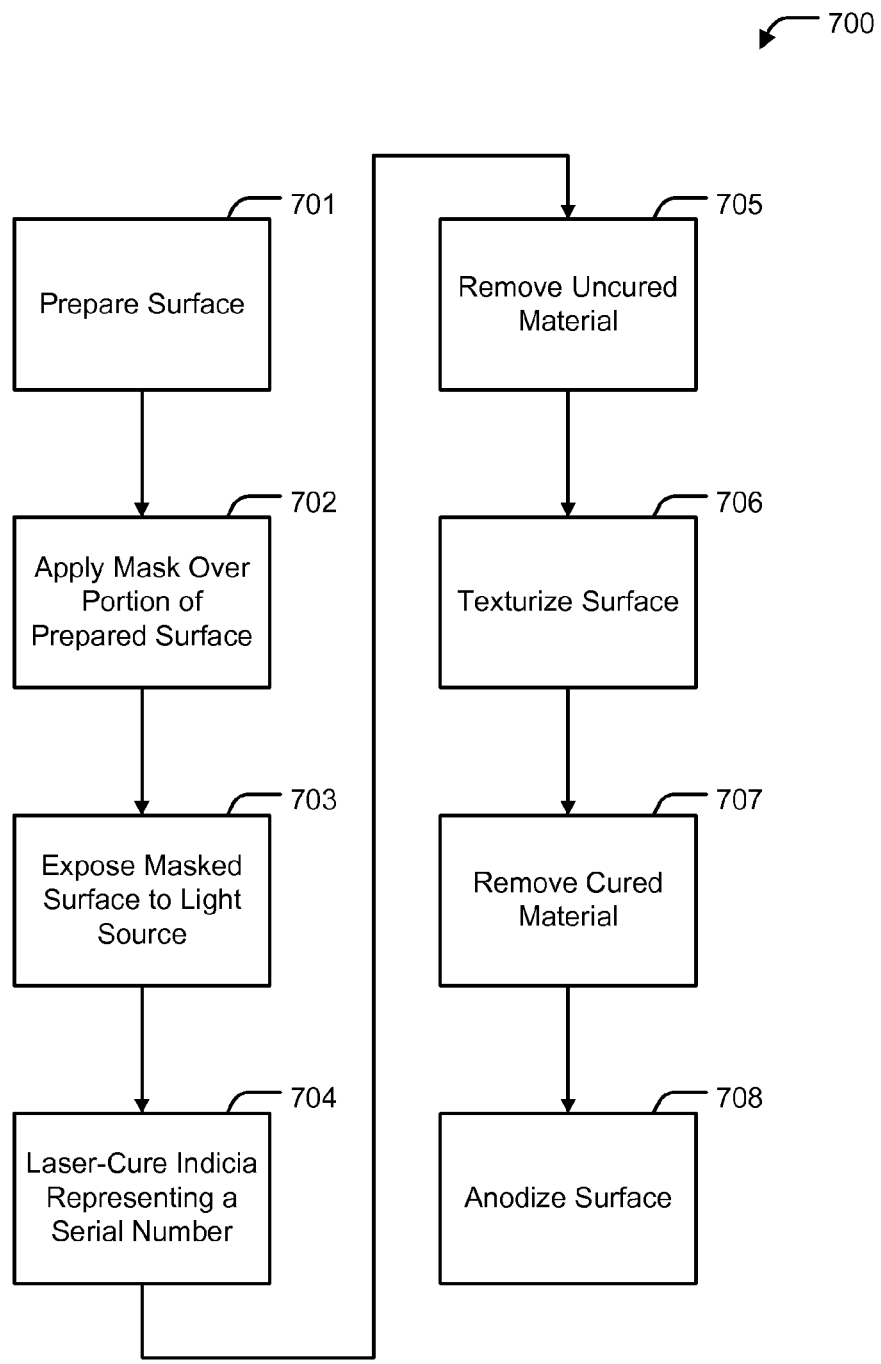
FIG. 7 is a flowchart of a method of serializing a product, according to an embodiment of the invention.
Figure 8:
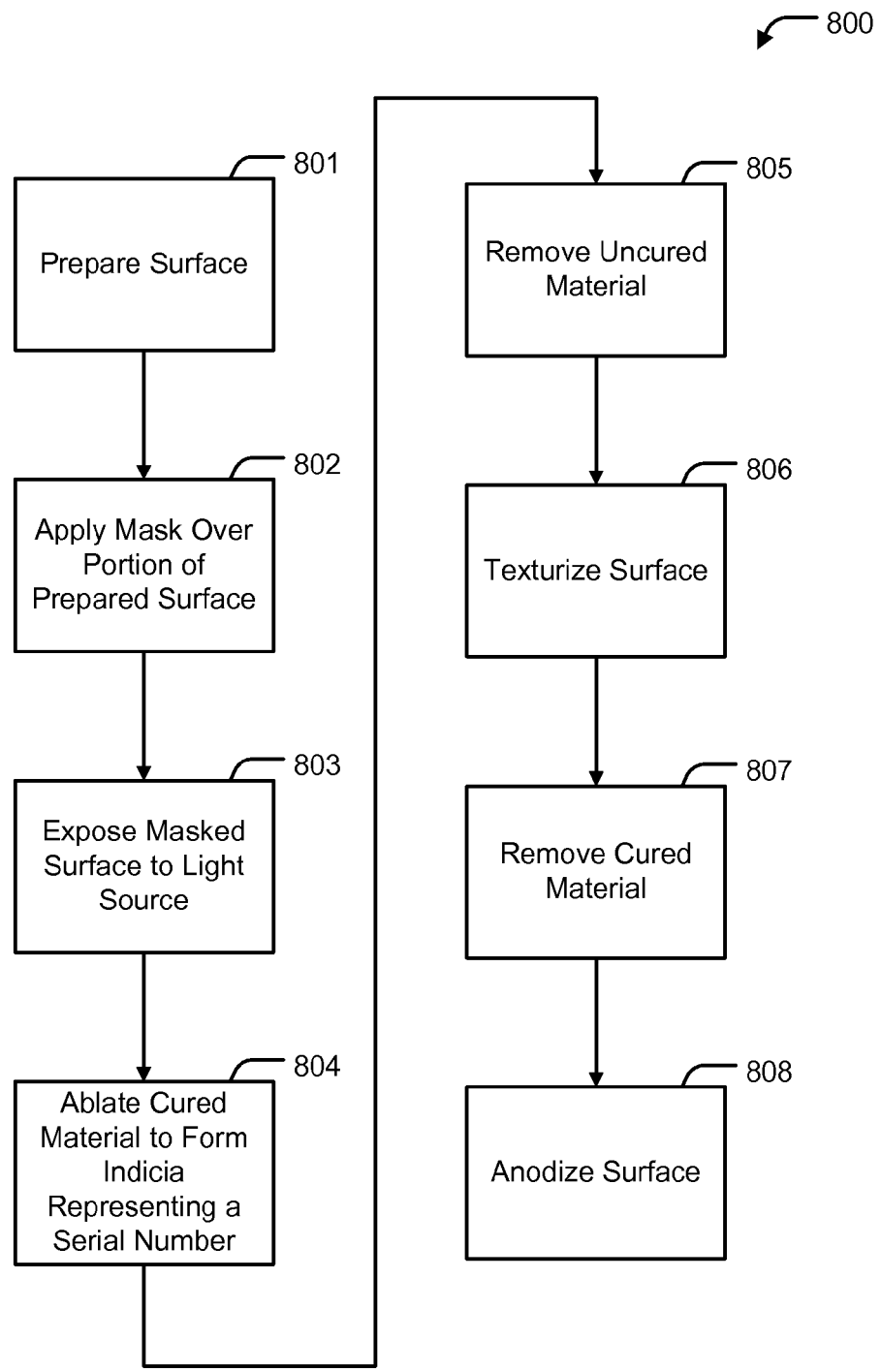
FIG. 8 is a flowchart of a method of serializing a product, according to an embodiment of the invention.

Serialization of the housing at block 602 may include any suitable process, including processes incorporating relatively high-heat or chemicals that may damage assembled devices. FIGS. 7-8 depict methods of serializing housings according to some embodiments.

FIG. 7 is a flowchart of a method 700 of serializing a product, according to an embodiment of the invention. The method 700 includes preparing a surface of a device housing at block 701. Preparing the surface may include preparing at least a portion of an exterior surface of the device housing to be serialized and have indicia formed thereon. The preparing may include applying a mirror finish or other suitable finish to the exterior surface and application of a film of light-curable material or photo-resist.

The method 700 further includes applying mask over at least a portion of the prepared surface at block 702. The mask may include a block or segment generally related to area 4 of FIG. 3 such that a portion of light-curable material is shielded from light.

The method 700 further includes exposing the masked surface to a light source at block 703 to cure the light-curable material. For example, the light-curable material may harden from exposure to light, or change chemistry to allow further processing.

The method 700 further includes laser-curing indicia representing a product identifier and/or serial number at block 704. The laser-curing may include curing portions of the area masked at block 702 to form a positive image of the indicia in the light-curable material.

Thereafter, the method 700 includes removing uncured material from the surface of the housing at block 705. The removing may include applying a chemistry or solution to the light-curable material to remove the uncured portions. The removing may leave cured portions of the material on the surface such that areas beneath it correspond to the indicia noted above.

Thereafter, the method 700 includes texturizing the surface of the housing at block 706. Texturizing may include bead blasting, sand blasting, chemical texturizing, or any other suitable texturizing.

Thereafter, the method 700 includes removing cured material from the surface of the housing at block 707. The removing exposes contrasting surface finishes which depict the indicia noted above.

Thereafter, the method 700 includes anodizing surfaces of the housing at block 708. Anodizing may be facilitated through a variety of processes, and may include forming a thin oxide layer on a surface of the housing. Alternatively, anodizing may be omitted, for example, if the housing or indicia are formed of/in glass or ceramic. Additionally, a sealant or other chemistry may be applied to the anodized or non-anodized surface for further protection.

Although described as involving a mask obscuring at least an area corresponding to area 4 of the product being serialized, it should be understood that the same may be varied in many ways. For example, FIG. 8 is a flowchart of an alternate method 800 of serializing a product, according to an embodiment of the invention.

The method 800 includes preparing a surface of a device housing at block 801. Preparing the surface may include preparing at least a portion of an exterior surface of the device housing to be serialized and have indicia formed thereon. The preparing may include applying a mirror finish or other suitable finish to the exterior surface and application of a film of light-curable material or photo-resist.

The method 800 further includes applying mask over at least a portion of the prepared surface at block 802. The mask may include an open block or segment generally related to area 4 of FIG. 3 such that a portion of light-curable material is not shielded from light or exposed to light.

The method 800 further includes exposing the masked surface to a light source at block 803 to cure the light-curable material. For example, the light-curable material may harden from exposure to light, or change chemistry to allow further processing.

The method 800 further includes ablating material to form indicia representing a product identifier and/or serial number at block 804. The ablating may include ablating portions of the area masked at block 802 to form a positive image of indicia in the cured material.

Thereafter, the method 800 includes removing uncured material from the surface of the housing at block 805. The removing may include applying a chemistry or solution to the light-curable material to remove the uncured portions. The removing may leave cured portions of the material on the surface such that areas beneath it correspond to the indicia noted above.

Thereafter, the method 800 includes texturizing the surface of the housing at block 806. Texturizing may include bead blasting, sand blasting, chemical texturizing, or any other suitable texturizing.

Thereafter, the method 800 includes removing cured material from the surface of the housing at block 807. The removing exposes contrasting surface finishes which depict the indicia noted above.

Thereafter, the method 800 includes anodizing surfaces of the housing at block 808. Anodizing may be facilitated through a variety of processes, and may include forming a thin oxide layer on a surface of the housing. Alternatively, anodizing may be omitted, for example, if the housing or indicia are formed of/in glass or ceramic. Additionally, a sealant or other chemistry may be applied to the anodized or non-anodized surface for further protection.

Upon serialization of product housings as described above, the housing may be used to assemble a final product. Generally, serialization of the product housing may occur first or upstream of device assembly, and may be followed by blocks 603-605 of the method 600 described above. Thereafter, assembly may occur. Alternatively, the methods 700/800 may be at least partially integrated with method 600.

Figure 9:
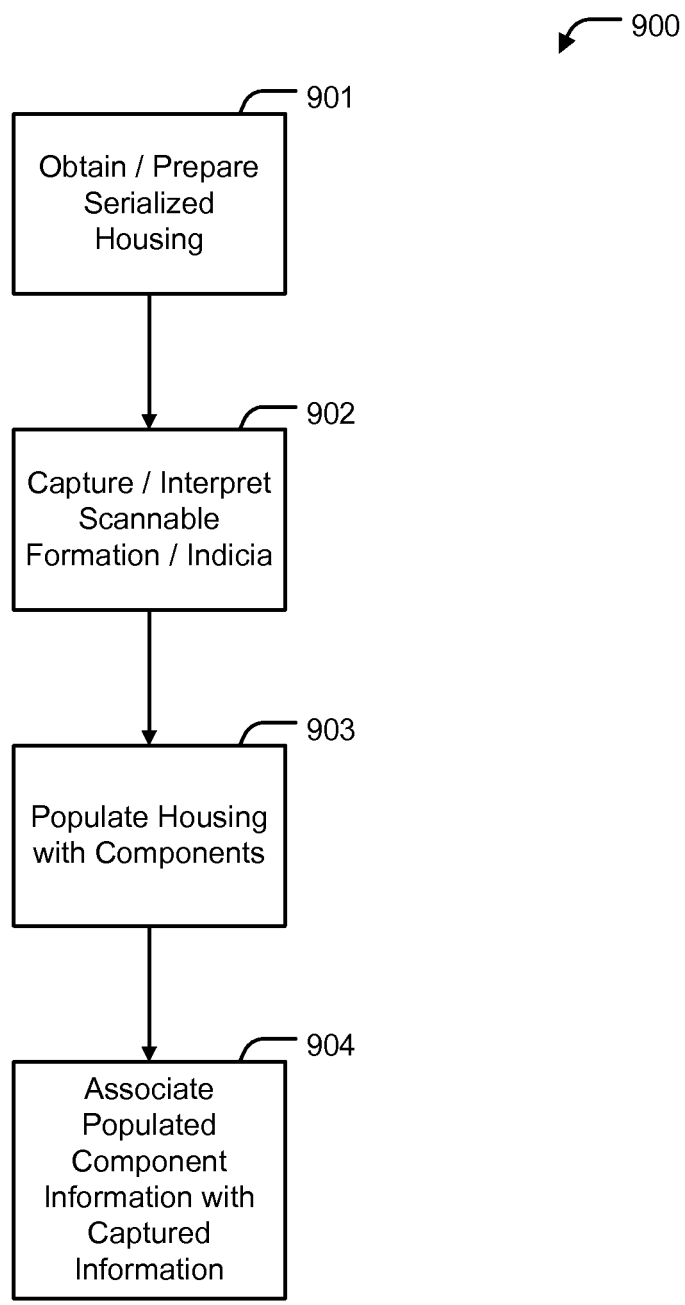
FIG. 9 is a flowchart of a method of assembling a product with a pre-serialized housing, according to an embodiment of the invention.

FIG. 9 is a flowchart of a method 900 of assembling a product with a pre-serialized housing, according to an embodiment of the invention. As shown, the method 800 includes obtaining/preparing a pre-serialized housing at block 901. The pre-serialized housing may be a housing having indicia 42 and 9 formed thereon and therein as depicted in FIGS. 3-4. As such, the pre-serialized housing may include a coded formation representing a device identifier further represented by indicia formed on an exterior surface thereof.

The method 900 further includes capturing/interpreting the coded formation or indicia at block 902. The capturing/interpreting may include scanning the coded formation 9 to retrieve the device identifier.

The method 900 further includes populating the housing with device components, such as components necessary for operation of the device, at block 903.

The method 900 further includes associating information related to the populated components to the captured device identifier at a device identifier database at block 904. The associating may be facilitated through a controller or through entry at a terminal or keyboard by technicians performing the method 900 or portions thereof.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A system for integrating a marked product housing, comprising:
    an image capture device configured to capture an image of indicia formed on an exterior surface of the marked product housing;
    a controller in operative communication with the image capture device configured to process the image of the indicia to retrieve a unique product identifier represented by the indicia; and
    an indicia forming device in operative communication with the controller configured to form a coded formation onto an interior surface of the marked product housing representing the unique product identifier.

2. The system of claim 1, wherein the image capture device comprises an image sensor.

3. The system of claim 1, wherein the controller is configured to direct the indicia forming device to form the coded formation responsive to processing of the image of the indicia.

4. The system of claim 1, wherein the indicia forming device is a laser-etching device configured to etch portions of the interior surface of the marked product housing.

5. The system of claim 1, further comprising:
    a device identifier database in communication with the controller, the device identifier database configured to store the retrieved unique product identifier.

6. The system of claim 1, wherein the unique product identifier is a fixed pattern of characters related to activation or use of a device assembled with the marked product housing.

7. The system of claim 6, wherein the device is a personal electronic device.

8. A system for integrating a marked product housing, comprising:
    an input device configured to interpret a coded formation on an interior surface of the marked product housing representing a unique product identifier, the unique product identifier being further represented by indicia formed on an exterior surface of the marked product housing;
    a controller in operative communication with the input device configured to process the unique product identifier and associate the unique product identifier in a device identifier database.

9. The system of claim 8, wherein the input device comprises an image sensor.

10. The system of claim 8, wherein the input device is a barcode scanner.

11. The system of claim 8, wherein the unique product identifier is a fixed pattern of characters related to activation or use of a device assembled with the marked product housing.

12. The system of claim 11, wherein the device is a personal electronic device.

13. A product housing, comprising:
    an exterior surface, the exterior surface having indicia formed thereon representing a unique product identifier, the indicia being formed with an anodization process; and
    an interior surface, the interior surface having a coded formation formed thereon representing the unique product identifier, the coded formation being formed through a process separate from the anodization process.

14. The product housing of claim 13, wherein the anodization process includes at least a masking process, a laser-curing process, and a texturizing process.

15. The product housing of claim 13, wherein the process separate from the anodization process is a laser-etching process or an ink-printing process.

16. The product housing of claim 13, wherein the exterior surface further includes a company logo formed thereon through the anodization process.

17. A method of marking a product housing, comprising:
    applying a first indicia representing a unique product identifier on an exterior surface of the product housing;
    capturing and interpreting the first indicia to retrieve the unique product identifier;
    storing the retrieved unique product identifier; and
    applying a coded formation to an interior surface of the product housing representing the retrieved unique product identifier.

18. The method of claim 17, wherein applying the first indicia comprises:
    applying a photo-sensitive material on a portion of the exterior surface;
    applying a mask over the photo-sensitive material, the mask obscuring an area reserved for product marking;
    exposing the photo-sensitive material to cure a portion thereof;
    laser-curing a portion of uncured photo-sensitive material to form a positive image of the first indicia in the reserved area;
    removing uncured material from the exterior surface;
    texturizing the exterior surface exposed by the removing; and
    removing the cured photo-sensitive material from the texturized exterior surface.

19. The method of claim 18, further comprising:
    anodizing the texturized and non-texturized surface.

20. The method of claim 17, wherein applying the first indicia comprises:
    applying a photo-sensitive material on a portion of the exterior surface;

applying a mask over the photo-sensitive material, the mask exposing an area reserved for product marking;
exposing the photo-sensitive material to cure a portion thereof;
ablating a portion of cured photo-sensitive material to form a positive image of the first indicia in the reserved area;
removing uncured material from the exterior surface;
texturizing the exterior surface exposed by the removing; and
removing the cured material from the texturized exterior surface.

\* \* \* \* \*